(12) United States Patent
Chi et al.

(10) Patent No.: US 11,693,405 B2
(45) Date of Patent: Jul. 4, 2023

(54) SYSTEMS FOR IMPLEMENTING FALLBACK BEHAVIORS FOR AUTONOMOUS VEHICLES

(71) Applicant: Waymo LLC, Mountain View, CA (US)

(72) Inventors: Emily Chi, Los Angeles, CA (US); Ryan Joseph Andrade, Morgan Hill, CA (US); Michael James, Northville, MI (US); Ioan-Alexandru Sucan, Mountain View, CA (US); Christopher Kennedy Ludwick, Los Altos, CA (US); Joshua Seth Herbach, San Francisco, CA (US); Misha Balakhno, Mountain View, CA (US); Andrew Barton-Sweeney, Oakland, CA (US)

(73) Assignee: Waymo LLC, Mountain View, CA (US)

( * ) Notice: Subject to any disclaimer, the term of this patent is extended or adjusted under 35 U.S.C. 154(b) by 210 days.

(21) Appl. No.: 17/037,924

(22) Filed: Sep. 30, 2020

(65) Prior Publication Data
US 2021/0048816 A1 Feb. 18, 2021

Related U.S. Application Data

(63) Continuation of application No. 16/180,267, filed on Nov. 5, 2018, now Pat. No. 10,838,417.

(51) Int. Cl.
G05D 1/00 (2006.01)
G05D 1/02 (2020.01)

(52) U.S. Cl.
CPC ......... G05D 1/0077 (2013.01); G05D 1/0088 (2013.01); G05D 1/0212 (2013.01); G05D 1/0223 (2013.01)

(58) Field of Classification Search
CPC .. G05D 1/0077; G05D 1/0088; G05D 1/0212; G05D 1/0223; B60W 60/00186;
(Continued)

(56) References Cited

U.S. PATENT DOCUMENTS 6,151,539 A 11/2000 Bergholz et al.
6,873,251 B2 3/2005 Schiffmann et al.
(Continued)

FOREIGN PATENT DOCUMENTS

CN 108196547 A 6/2018
EP 2168835 A1 3/2010
(Continued)

OTHER PUBLICATIONS

Notice of Reasons for Rejection for Japanese Patent Application No. 2021-523165, dated Jun. 24, 2022.
(Continued)

Primary Examiner — Brian P Sweeney
(74) Attorney, Agent, or Firm — Botos Churchill IP Law

(57) ABSTRACT

Aspects of the disclosure relate to controlling a vehicle in an autonomous driving mode. The system includes a plurality of sensors configured to generate sensor data. The system also includes a first computing system configured to generate trajectories using the sensor data and send the generated trajectories to a second computing system. The second computing system is configured to cause the vehicle to follow a receive trajectory. The system also includes a third computing system configured to, when there is a failure of the first computer system, generate and send trajectories to the second computing system based on whether a vehicle is located on a highway or a surface street.

20 Claims, 7 Drawing Sheets

(58) Field of Classification Search
CPC . B60W 2050/0215; B60W 2050/0292; B60W 2552/05; B60W 50/023; B60W 30/14; B60W 40/02; B60W 40/06; B60W 40/105; B60W 50/029; B60W 2420/00; B60W 2520/10
See application file for complete search history.

(56) References Cited

U.S. PATENT DOCUMENTS

| | | | |
|---|---|---|---|
| 9,910,441 | B2 | 3/2018 | Levinson et al. |
| 2007/0293989 | A1 | 12/2007 | Norris |
| 2011/0241862 | A1 | 10/2011 | Debouk et al. |
| 2013/0253756 | A1 | 9/2013 | Matsuno |
| 2014/0303812 | A1 | 10/2014 | Avritch et al. |
| 2015/0012166 | A1 | 1/2015 | Hauler et al. |
| 2015/0307110 | A1 | 10/2015 | Grewe et al. |
| 2016/0103450 | A1 | 4/2016 | Hogenmueller et al. |
| 2017/0010612 | A1 | 1/2017 | Asakura et al. |
| 2017/0090476 | A1 | 3/2017 | Letwin et al. |
| 2017/0147004 | A1 | 5/2017 | Reichel et al. |
| 2017/0291560 | A1 | 10/2017 | Schroeder et al. |
| 2017/0364066 | A1 | 12/2017 | Yamada et al. |
| 2018/0046182 | A1 | 2/2018 | Joyce et al. |
| 2018/0046191 | A1 | 2/2018 | Keller et al. |
| 2018/0251126 | A1* | 9/2018 | Linscott ............... G05D 1/0274 |
| 2018/0297609 | A1 | 10/2018 | Bozsik |
| 2020/0290641 | A1 | 9/2020 | Kawakami |

FOREIGN PATENT DOCUMENTS

| | | | | |
|---|---|---|---|---|
| EP | 3179270 | A1 | 6/2017 | |
| EP | 3739414 | A1 | 11/2020 | |
| EP | RP 3739414 | A1 * | 11/2020 | ............... G05D 1/02 |
| JP | 2007257303 | A | 10/2007 | |
| JP | 2011191894 | A | 9/2011 | |
| JP | 2011240816 | A | 12/2011 | |
| JP | 2016505436 | A | 2/2016 | |
| JP | 2017032543 | A | 2/2017 | |
| JP | 2017117080 | A | 6/2017 | |
| JP | 6381835 | B1 | 8/2018 | |

OTHER PUBLICATIONS

International Search Report and Written Opinion for Application No. PCT/US2019/058766 dated Feb. 20, 2020.
Bento, et al., "Sensor Fusion for Precise Autonomous Vehicle Navigation in Outdoor Semi-structured Environments", Proceedings of the 8th International IEEE Conference on Intelligent Transportation Systems, Vienna, Austria, Sep. 13-16, 2005, 6 pages.
Sklaroff, "Redundancy Management Technique for Space Shuttle Computers", IBM J. Res. Develop., Redundancy Management, Jan. 1976, pp. 20-28.
Wei, et al., "Towards a Viable Autonomous Driving Research Platform", Department of Electrical and Computer Engineering, Carnegie Mellon University, Pittsburgh, PA 15213, USA, 2013, 8 pages.
Notice of Preliminary Rejection for Korean Patent Application No. 10-2021-7016925, dated Jun. 10, 2022.
The Extended European Search Report for European Patent Application No. 19881197.8, dated May 30, 2022.
Notice of Allowance for Korean Patent Application No. 10-2021-7016925, dated Aug. 12, 2022.
Office Action for Canadian Patent Application No. 3,118,477, dated Aug. 12, 2022.

* cited by examiner

SYSTEMS FOR IMPLEMENTING FALLBACK BEHAVIORS FOR AUTONOMOUS VEHICLES

CROSS REFERENCE TO RELATED APPLICATIONS

The present application is a continuation of U.S. patent application Ser. No. 16/180,267, filed Nov. 5, 2018, the entire disclosure of which is incorporated by reference herein.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pick up or destination location, and the vehicle maneuvers itself to that location. While doing so, safety of passengers, cargo, and the vehicle is an important consideration. Accordingly, often these vehicles have fallback systems which essentially cause the vehicle to apply the brakes as hard and as quickly as possible in an emergency.

BRIEF SUMMARY

Aspects of the disclosure provide a system for controlling a vehicle in an autonomous driving mode. The system includes a plurality of sensors configured to generate sensor data, a first computing system, and a third computing system. The first computing system is configured to generate trajectories using the sensor data and send the generated trajectories to a second computing system configured to cause the vehicle to follow a received trajectory. The third computing system is configured to, when there is a failure of the first computer system, generate and send trajectories to the second computing system based on a type of road on which the vehicle is currently traveling.

In one example, the third computing system is further configured to generate and send the trajectories based on whether a vehicle is located on a highway or a surface street. In another example, the system also includes the second computing system. In another example, the failure relates to one or more of the plurality of sensors, and the third computing system is configured to generate the trajectories further based on which of the plurality of sensors is functioning. In another example, the first computing system is configured to differentiate between different types of road users in the sensor data, and the second computing system is not configured to differentiate between different types of road users in the sensor data. In this example, the first computing system is configured to generate different behavior predictions based on each of the different types of road users, wherein the third computing system is configured to generate behavior predictions for all road users in the sensor data in a same way. In this example, the third computing system is configured to generate behavior predictions corresponding to either following a current lane or changing lanes in response to a detection of any given road user on a highway. In another example, the first computing system is configured to generate trajectories according to a first list of possible maneuvers, and the third computing system is configured to generate trajectories according to a second list of possible maneuvers that is smaller than the first list of possible maneuvers. In this example, the third computing system is configured to determine the second list of possible maneuvers based on whether the vehicle is located on a highway or a surface street. In addition or alternatively, the third computing system is configured to determine the second list of possible maneuvers based on which of the plurality of sensors is functioning. In addition or alternatively, the third computing system is configured to determine the second list of possible maneuvers based on available sensor functionality for the plurality of sensors.

In another example, the third computing system is further configured to prevent the vehicle from making certain types of maneuvers which are allowed by the first computing system. In this example, the certain types of maneuvers include turns of a certain curvature. In another example, the third computing system is further configured to determine that the vehicle is located on a highway or a surface street by referring to pre-stored map information, and to generate and send the trajectories further based on the determination that the vehicle is located on a highway or surface street. In this example, the first computing system is configured to detect traffic lights using traffic light detection functionality and when the vehicle is determined to be located on a highway, the third computing system is further configured to generate trajectories without using the traffic light detection functionality. In addition or alternatively, when the vehicle is determined to be located on a highway, the third computing system is further configured to generate trajectories in order to control the vehicle to exit the highway and reach a surface street. In this example, the third computing system is configured to search for an exit proximate to a surface street with certain characteristics, and to generate trajectories in order to control the vehicle to exit the highway at the exit and reach a surface street. Alternatively, the first computing system is configured to detect traffic lights using traffic light detection functionality and when the vehicle is determined to be located on a surface street, the third computing system is further configured to generate trajectories using the traffic light detection functionality. In addition or alternatively, the third computing system is further configured to generate trajectories in order to control the vehicle to travel at a predetermined speed when the vehicle is determined to be located on a surface street, the predetermined speed providing for time to detect and respond to objects in the environment of the vehicle. As another example, the system also includes the vehicle.

DETAILED DESCRIPTION

Overview

Figure 1:
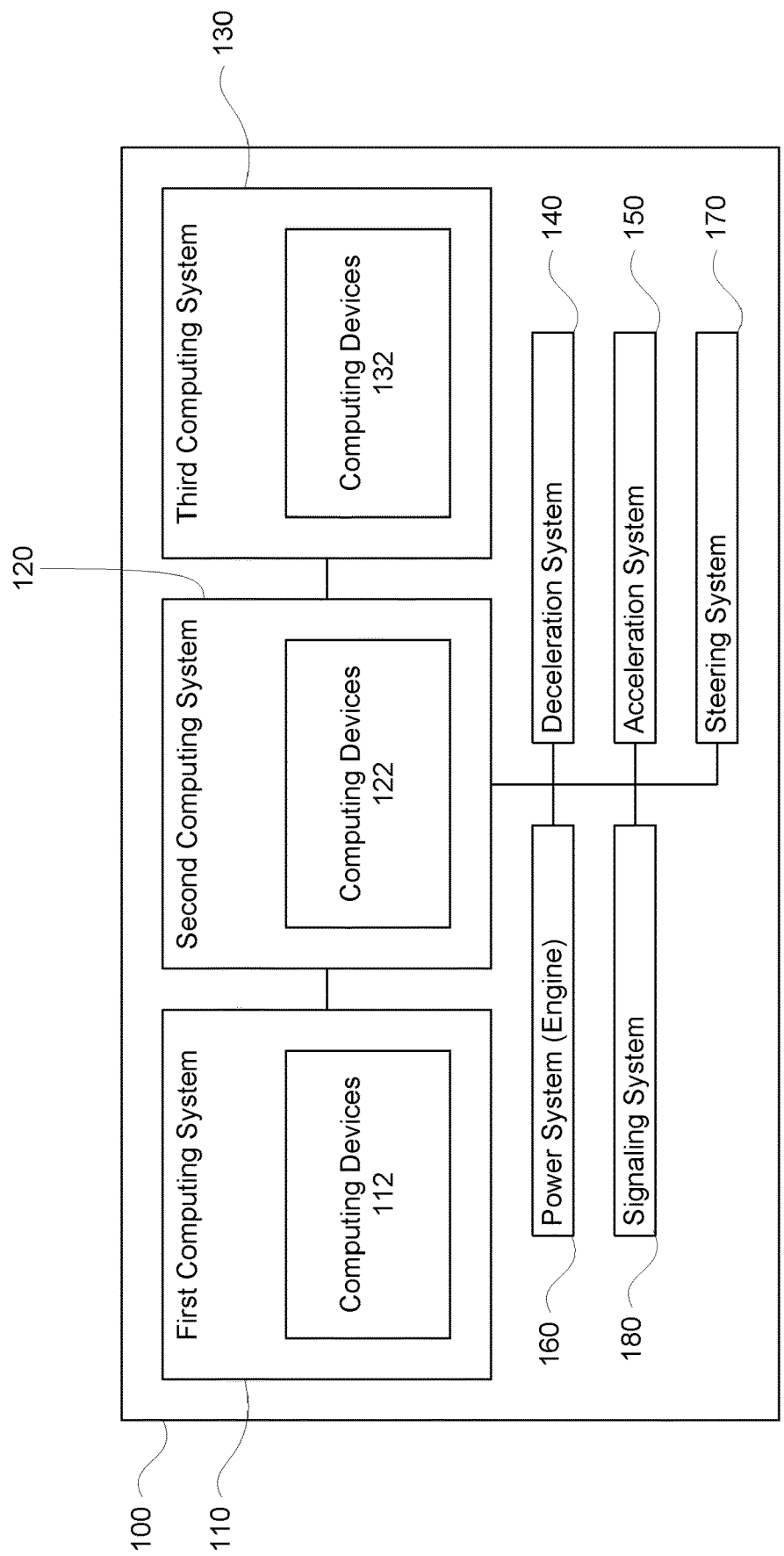
FIG. 1 is a functional diagram of an example vehicle in accordance with an exemplary embodiment.

The technology relates to fallback driving behaviors for autonomous vehicles. During typical operation, a first computer system may generate a trajectory and send it to a second computing system in order to control the vehicle according to that trajectory. The trajectory includes at least some portion that allows the vehicle to proceed towards its end goal or destination, and thereafter, the trajectory provides fallback instructions for the vehicle to safely pull over, stop, etc. such that if the first computer system is not able to generate a new trajectory because of some problem with the vehicle's various systems, the vehicle can safely pull over, stop, etc. This can be problematic on highways and in situations where there is heavy vehicular or pedestrian traffic, and pulling over or stopping are not the best actions for the vehicle to execute in the event of a failure of one or more systems on the vehicle. To avoid this, if a given type of failure in some hardware or software system of the vehicle is detected, a third computer system, or a fall back system, with reduced performance may be used to control the vehicle. Depending upon the driving situation and functionality available, the fallback system may behave in different ways with the overall goal of minimizing the likelihood of the vehicle stopping in its lane.

The first computing system may include a highly sophisticated planner system, perception system, and software stacks. For instance, perception system of the first computing system may include different software modules designed to allow for the detection of different objects in the vehicle's environment. The software stack of the first computing system may use behavior models to predict how these objects are likely to behave for some period of time into the future. Similarly, the planner system of the first computing system may use these predictions and detailed map information in order to generate trajectories which allow the vehicle to conduct all types of maneuvers.

The second computing system may be configured to receive trajectories from the first computing system and control various actuators of the vehicle in order to control the vehicle according to those received trajectories. In this regard, the second computing system need not include planner or perception modules.

The third computing system may have different capabilities than the first and second computing systems. For instance, the third computing system may have greater computing capabilities than the second computer. At the same time, the third computing system may have less capabilities and power requirements than the first computing system. The third computing system may have a more streamlined version of the perception system and behavior models of the first computing system.

When an error in the first computing system is detected, the third computing system may take over for the first computing system in order to generate trajectories for the second computing system. In order to do so, when an error in the first computing system is detected, the third computing system may determine a type of road, for instance highway or surface street, on which the vehicle is driving by comparing the vehicle's last known or current location to map information. Based on this comparison, the third computing system may determine how to control the vehicle and according to what functionality.

When an error in the first computing system is detected, the third computing system may assess the functionality of available sensors of the vehicle in order to determine what, if any, types of location the vehicle should avoid. In other words, there may be a hierarchy of road scopes requiring different types of functionality, and if the vehicle does not have the functionality required for a certain road scope, the third computing system may avoid areas having that road scope.

The features described herein may allow the vehicle to continue to be controlled safely in the event of various types of failures of a first or primary computing system. In addition, these features allow for different fallback behaviors depending upon what functionality is available and where the vehicle is currently located. In other words, the third computing system is able to leverage current functionality to get to the best possible outcome.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have a plurality of computing systems, such as first computing systems 110, second computing system 120, and third computing system 130, each including one or more computing devices 112, 122, 132. Together, these computing systems and devices may function as an autonomous driving computing system incorporated into vehicle 100.

Figure 2:
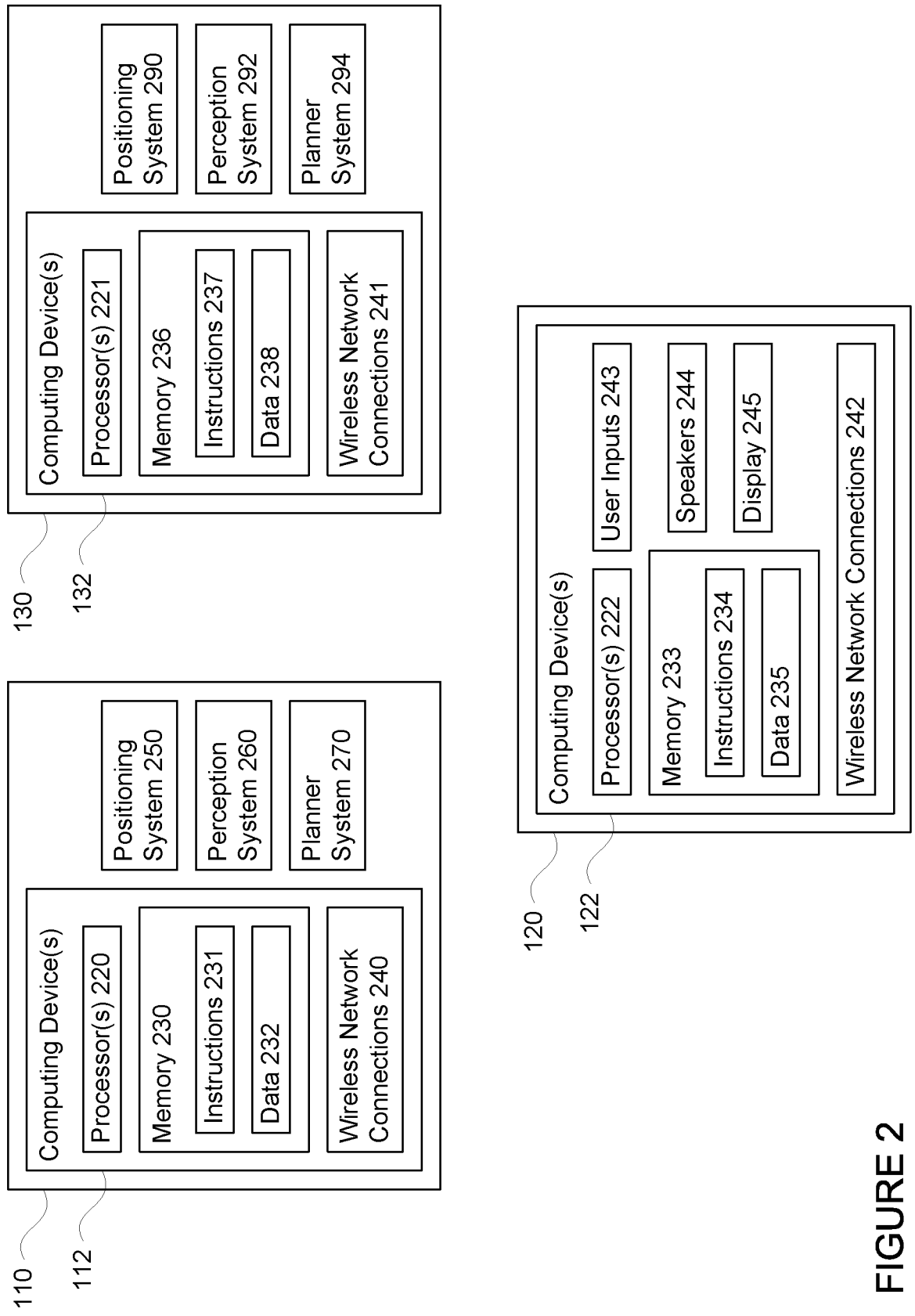
FIG. 2 is a functional diagram of aspects of the system of FIG. 1 in accordance with aspects of the disclosure.

Turning to FIG. 2, which provides additional details of the first, second and third computing systems, each of these computing devices 112, 122, 132 may include one or more processors 220, 221, 223, memory 230, 233, 236 and other components typically present in general purpose computing devices. The memory 230, 233, 236 stores information accessible by the one or more processors 220, 221, 222, including instructions 231, 234, 237 and data 232, 235, 238 that may be executed or otherwise used by the processor 220, 221, 222, respectively. The memory 230, 233, 236 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 231, 234, 237 may be any set of instructions to be executed directly (such as machine code) or indirectly (such as scripts) by the processor. For example, the instructions may be stored as computing device code on the computing device-readable medium. In that regard, the terms "instructions" and "programs" and "software" may be used interchangeably herein. For instance, as discussed in further detail below, the instructions may include various software stacks with various capabilities and functionalities. The instructions may be stored in object code format for direct processing by the processor, or in any other computing device language including scripts or collections of independent source code modules that are interpreted on demand or compiled in advance. Functions, methods and routines of the instructions are explained in more detail below.

The data 232 may be retrieved, stored or modified by processor 220 in accordance with the instructions 234. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 220, 221, 222 may be any conventional processors, such as commercially available CPUs or GPUs. Alternatively, the one or more processors may be a dedicated device such as an ASIC or other hardware-based processor. Although FIG. 2 functionally illustrates the processor, memory, and other elements of computing device 210 as being within the same block, it will be understood by those of ordinary skill in the art that the processor, computing device, or memory may actually include multiple processors, computing devices, or memories that may or may not be stored within the same physical housing. For example, memory 230 of computing device 112 may be a hard drive or other storage media located in a housing different from that of computing device 112. Accordingly, references to a processor or computing device will be understood to include references to a collection of processors or computing devices or memories that may or may not operate in parallel.

Each of the computing devices 112, 122, 132 may also include one or more wireless network connections 240, 241, 242 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing device 122 of computing system 120 may also include all of the components normally used in connection with a computing device such as the processor and memory described above as well as one or more user inputs 243 (e.g., a mouse, keyboard, touch screen and/or microphone) and various electronic displays (e.g., a monitor having a screen or any other electrical device that is operable to display information). In this example, the vehicle includes an internal electronic display 245 as well as one or more speakers 244 to provide information or audio-visual experiences. In this regard, internal electronic display 246 may be located within a cabin of vehicle 100 and may be used by computing device 122 to provide information to passengers within the vehicle 100.

The computing system 110 may also include positioning system 250, perception system 260, and planner system 270. Each of these systems may include sophisticated software modules and/or may include one or more dedicated computing devices having processors and memory configured the same or similarly to computing devices 112, 122, 132, processors 220, and memory 230. For instance, the positioning system 250 may also include other devices in communication with computing devices 122, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 122, other computing devices and combinations of the foregoing.

Figure 3:
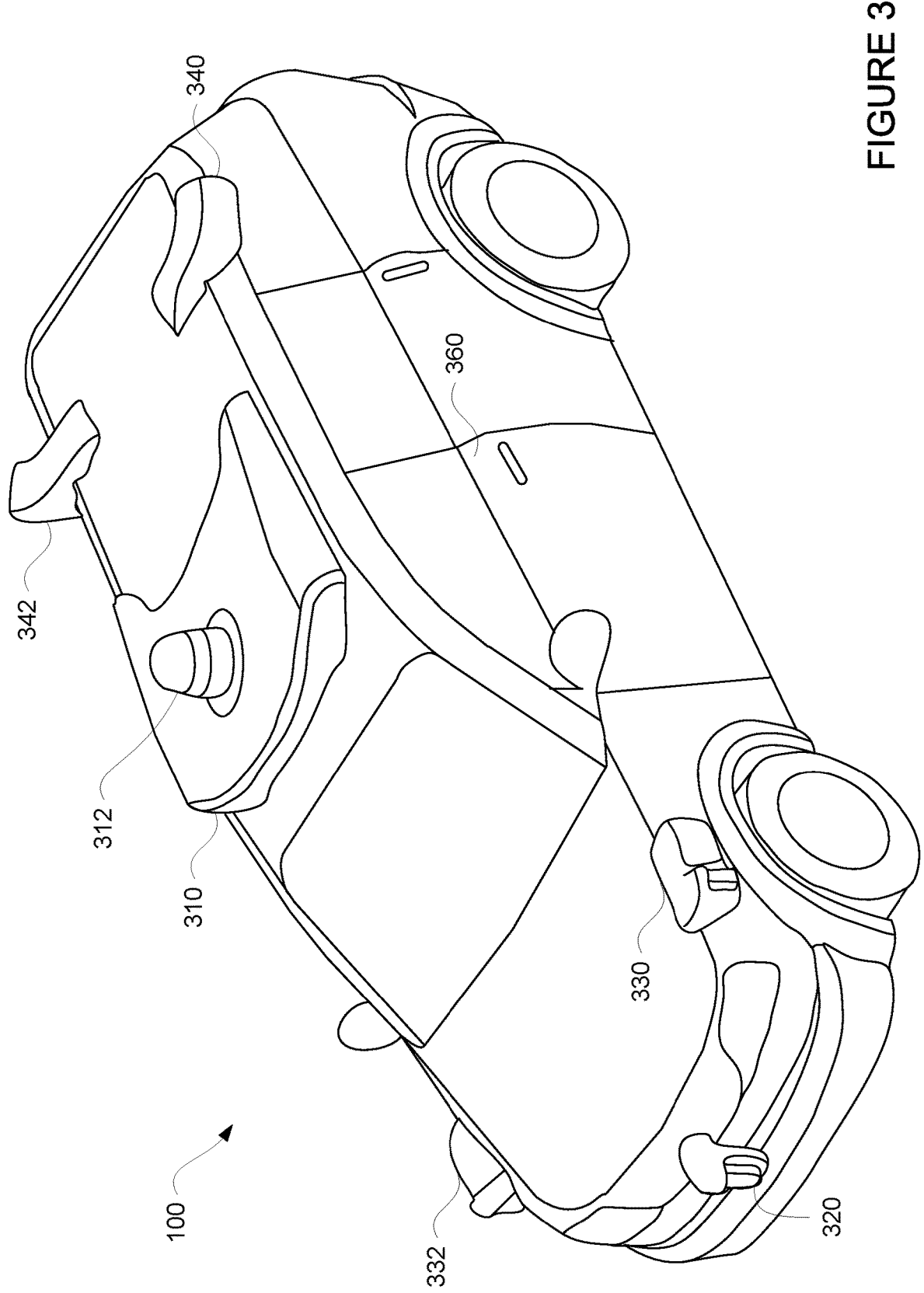
FIG. 3 is an example external view of a vehicle in accordance with aspects of the disclosure.

The perception system 260 may include one or more components for detecting objects external to the vehicle such as other vehicles, obstacles in the roadway, traffic signals, signs, trees, etc. For example, the perception system 260 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor or system as well as various cameras and radar units. In addition, housing 320 located at the front end of vehicle 100 and housings 330, 332 on the driver's and passenger's sides of the vehicle may each store a LIDAR sensor or system. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The perception system 260 may include different software modules designed to allow for the detection of different objects in the vehicle's environment. For example, the perception system of the first computing system may include modules for detecting traffic lights and their states as well as other objects including different types of road users, such as pedestrians, vehicles, bicyclists, etc., as well as their characteristics such as location, orientation, heading, speed, acceleration, etc. The software stack of the first computing system may use sophisticated behavior models to predict how these objects are likely to behave for some period of time into the future. Similarly, the planner system of the first computing system may use these predictions and detailed map information in order to generate trajectories which allow the vehicle to conduct all types of maneuvers.

The planner system 270 may be used by computing device 112 in order to follow a route to a location. In this regard, the planner system 270 and/or data 132 of computing devices 112 may store detailed map information, e.g., highly detailed maps identifying the shape and elevation of roadways, lane lines, intersections, crosswalks, speed limits, traffic signals, buildings, signs, real time traffic information, pull over spots, vegetation, or other such objects, features and information.

Figure 4:
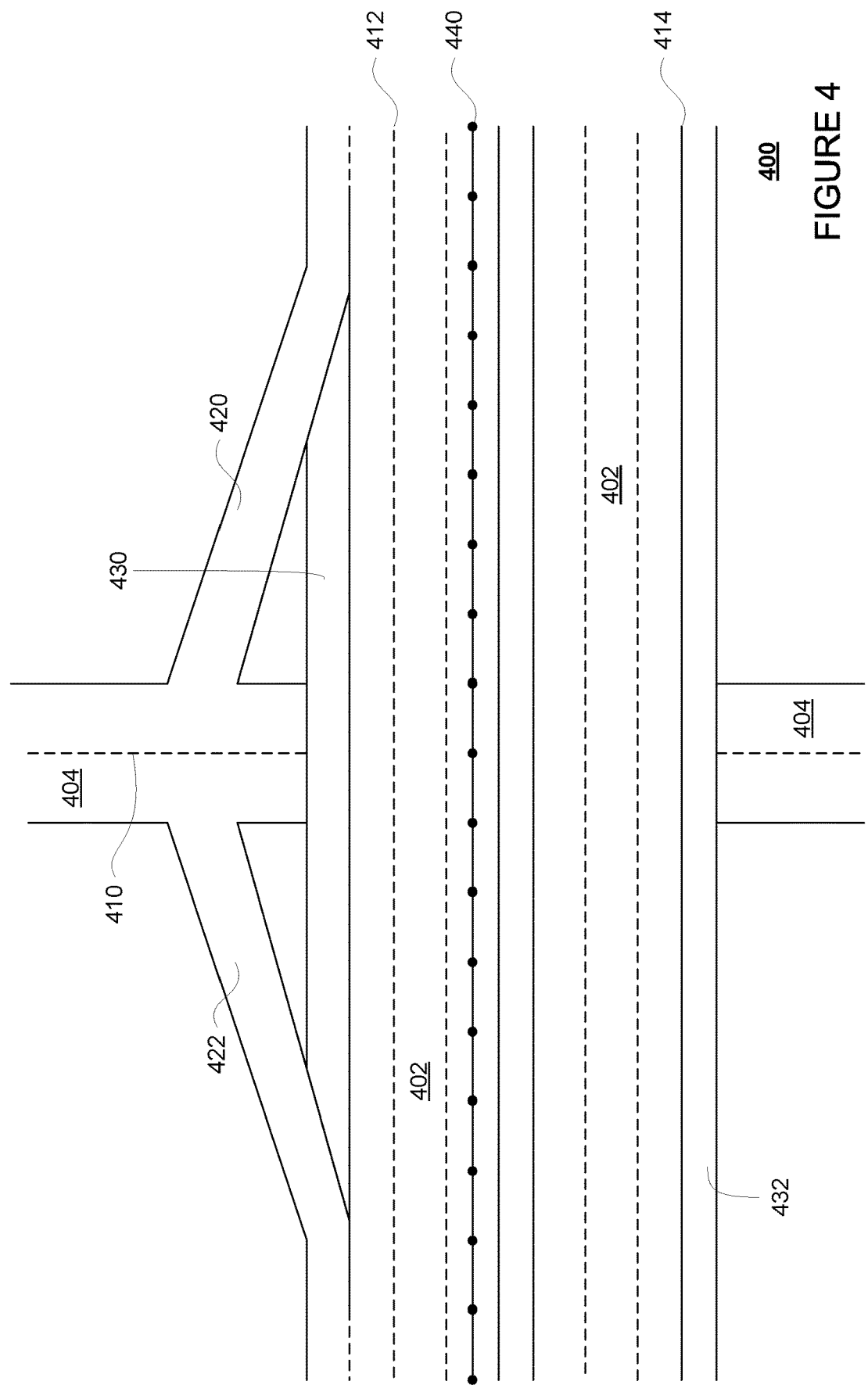
FIG. 4 is an example of map information in accordance with aspects of the disclosure.

FIG. 4 is an example of map information 400 for a section of roadway including highway 402 and surface street 404. In this example, highway 402 passes over surface street 404. The map information 400 may be a local version of the map information stored in the memory 230 of the computing devices 112. Other versions of the map information may also be stored in the memory of the computing devices 132 as discussed further below. In this example, the map information 400 includes information identifying the shape, location, and other characteristics of lane lines 410, 412, 414, highway exit ramp 420, highway entrance ramp 422, shoulder areas 430, 432, etc.

The map information may also define discrete portions of lanes of highway 402 and surface street 404 as individual segments 440 (shown connected end to end by dots) of a few meters or more or less, shown only with respect to a single lane of highway 402 for clarity. Of course, each lane of highway 402, surface street 404, highway exit ramp 420 and highway entrance ramp 422 may each be defined as road segments.

The map information may also differentiate between types of drivable surfaces, such as between highway and surface streets, such as residential streets, state or county roads, or any other non-highway street. In addition or alternatively, these areas may also be flagged as high pedestrian and/or high vehicular traffic areas. In this regard, the area and/or road segments of highway 402 may be designated as a highway, and the area and/or road segments of surface street 404, may be designated as a surface street.

Although, the map information is depicted herein as an image-based map, the map information need not be entirely image based (for example, raster). For example, the map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The various systems of the computing system 120 may function in order to determine how to control the vehicle 100. As an example, a perception system software module of the perception system 260 may use sensor data generated by the one or more sensors to detect and identify objects and their characteristics. These characteristics may include location, object type, heading, orientation, speed, acceleration, change in acceleration, size, shape, etc. In some instances, characteristics may be used by the computing devices 112 to determine a predicted future behavior for a detected object.

In one example, computing devices 112 may be operable to predict another vehicle's future movement based solely on the other vehicle's instant direction, acceleration/deceleration and velocity, e.g., that the other vehicle's current direction and movement will continue. However, memory 230 of computing devices 112 may also store behavior models that provides the probability of one or more actions being taken a detected object. To increase the usefulness of these behavior models, each behavior model may be associated with a specific type of object. For instance, one type of behavior model may be used for objects identified as pedestrians, another type of behavior model may be used for objects identified as vehicles, another type of behavior may be used for objects identified as bicycles or bicyclists, etc. The behavior models may be used by the computing devices 112 in order to predict a detected object future movement by analyzing data relating to the other vehicle's current surroundings (such as the detected or estimated size, shape, location, orientation, heading, velocity, acceleration or deceleration, change in acceleration or deceleration, etc.), and determining how that other object will likely respond to those surroundings. In this regard, the behavior models may function from an object-centric, view of the object's environment, in that the system determines what the other objects are perceiving in order to better predict how those objects will behave. In this regard, in at least some instances, the behavior models may also indicate whether the predicted behavior for an object is responsive to a particular other object including the vehicle 100.

In other instances, the characteristics may be put into one or more detection system software modules stored in memory 230 of computing devices 112. These detection system software modules may include, for instance, a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle.

Detected objects, predicted future behaviors, various likelihoods from detection system software modules, the map information identifying the vehicle's environment, position information from the positioning system 250 identifying the location and orientation of the vehicle, and a destination for the vehicle as well as feedback from various other systems of the vehicle may be input into a planner system software module of the planner system 270. The planner system 270 and/or computing devices 112 may use this input to generate a route and trajectories for the vehicle to follow for some brief period of time into the future. These trajectories may be generated periodically, for instance, 10 times per second or more or less, and may extend for some time and distance into the future in order to allow the vehicle follow the route to the destination. These trajectories may be generated as "desired paths" in order to avoid obstacles, obey laws and generally drive safely and effectively. Each trajectory may define various requirements for the vehicle's acceleration, speed, and position at different times along the trajectory. Each trajectory may include a first portion designed to cause the vehicle to reach a destination or end goal and a second portion designed to allow the vehicle to pull over or stop safely. In this regard, if a new trajectory is not received in time, the vehicle can safely pull over.

The second computing system 120 may be configured to receive trajectories from the first computing system and control various actuators of the vehicle in order to control the vehicle according to those received trajectories. For instance, a control system software module stored in the memory 232 of the computing devices 122 may be configured to control movement of the vehicle, for instance by controlling braking, acceleration and steering of the vehicle, in order to follow a trajectory. As an example, computing devices 122 may interact with one or more actuators of the vehicle's deceleration system 140 and/or acceleration system 150, such as brake pedal or other input, accelerator pedal or other input, and/or a power system 160 of the vehicle in order to control the speed of the vehicle. Similarly, steering system 170 may be used by the computing devices 122 in order to control the direction of vehicle 100. For example, if vehicle 100 is configured for use on a road, such as a car or truck, the steering system may include components to control the angle of wheels to turn the vehicle. Signaling system 180 may be used by computing device 110 in order to signal the vehicle's intent to other drivers or vehicles, for example, by lighting turn signals or brake lights when needed.

The power system 160 may include various features configured to supply power to the first, second, and third computing systems as well as other systems of the vehicle. In this regard, the power system 160 may include one or more batteries as well as an electric motor and/or a gasoline or diesel-powered engine.

The second computing system 120 need not include the aforementioned planner or perception hardware or software modules of the first computing systems. However, in some instances, the second computing system may include fairly simplistic detection systems, such as a forward-facing radar unit, configured to cause the second computing device to activate emergency braking in the event the second computing device is following the second portion of a trajectory and an object appears directly in front of the vehicle.

The third computing system 130 may have different capabilities than the first and second computing systems. For instance, the third computing system 130 may have greater computing capabilities than the second computer. At the same time, the third computing system may also have less capabilities and power requirements than the first computing system.

The third computing system 130 may also have a more streamlined version of some of the systems of the first computing system 110. For instance, the third computing system may include a copy of the map information in memory 232 of computing device 122 a positioning system 290, a perception system 292, and a planner system 294. Alternatively, rather than a copy, the third computing system may access the map information directly from memory 230 of computing device 112. The positioning system 290 may be the same or configured the same as or similarly to positioning system 250. However, each of the perception system 292 and the planner system 294 may be configured with different functionality than those of the first computing system 110 that results in less computing, resource, and/or other resource requirements for the third computing system 130 as compared to the first computing system 110.

For instance, the perception system 292 of the third computing system 130 may be configured to detect objects using, for instance, the sensors of the perception system 260 and/or additional sensors (for instance cameras, radar units, sonar, LIDAR sensors, etc.) specific to the perception system 292 itself. However, all objects that do not appear in the map information of the computing device 122, or rather, other road users, such as pedestrians, bicyclists, and vehicles, may all be responded to as if they were the same type of object. In this regard, the perception system of the third computing system need not differentiate different types of objects. As such, the third computing system 130 may perform more streamlined predictions of how objects will behave by making less dense (fewer estimates in the same period of time) and less precise predictions. In this regard, the third computing device may not include the aforementioned sophisticated behavior prediction software modules. Instead, the third computing device 132 may use fairly simplistic behavior models, such as simple extrapolating current speed, acceleration, deceleration, orientation, change in acceleration, change in orientation, etc. for a few seconds in the future or simply assuming that the vehicle will continue at its current speed, acceleration, deceleration, etc. while following a lane in which the object is currently located. As an example, all objects on a highway may be assumed by the third computing device to either continue to follow their lane at current speed, etc.

As another example, the planner system 294 of the third computing system may generate trajectories for the vehicle to follow. As with planner system 270, detected objects, predicted future behaviors, various likelihoods from detection system software modules, the map information identifying the vehicle's environment, position information from the positioning system 250 identifying the location and orientation of the vehicle, and a destination for the vehicle as well as feedback from various other systems of the vehicle may be input into a planner system software module of the planner system 294. The planner system 294 and/or computing devices 112 may use this input to generate a route and trajectories for the vehicle to follow for some brief period of time into the future. These trajectories may be generated periodically, for instance, 10 times per second or more or less, and may extend for some time and distance into the future in order to allow the vehicle follow the route to the destination. These trajectories may be generated as "desired paths" in order to avoid obstacles, obey laws and generally drive safely and effectively. Each trajectory may define various requirements for the vehicle's acceleration, speed, and position at different times along the trajectory. Each trajectory may include a first portion designed to cause the vehicle to reach a destination or end goal and a second portion designed to allow the vehicle to pull over or stop safely. In this regard, if a new trajectory is not received in time, the vehicle can safely pull over.

However, the planner system 294 may be limited in the types of maneuvers that its generated trajectories may include. In some instances, the types of maneuvers may be defined as one or more predetermined lists of maneuvers. Which predetermined list of maneuvers used by the planner system 294 may be determined based on a type of failures of the first computing system as well as where the vehicle is located as discussed further below. For example, the third computing system may only be able to generate trajectories for the vehicle to perform turns of certain curvature, turns of a certain type, etc. As another instance, the types of reactions necessary on a highway may be different from those that are necessary on surface streets, and thus, allowed maneuvers may be determined based on the location of the vehicle.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 5:
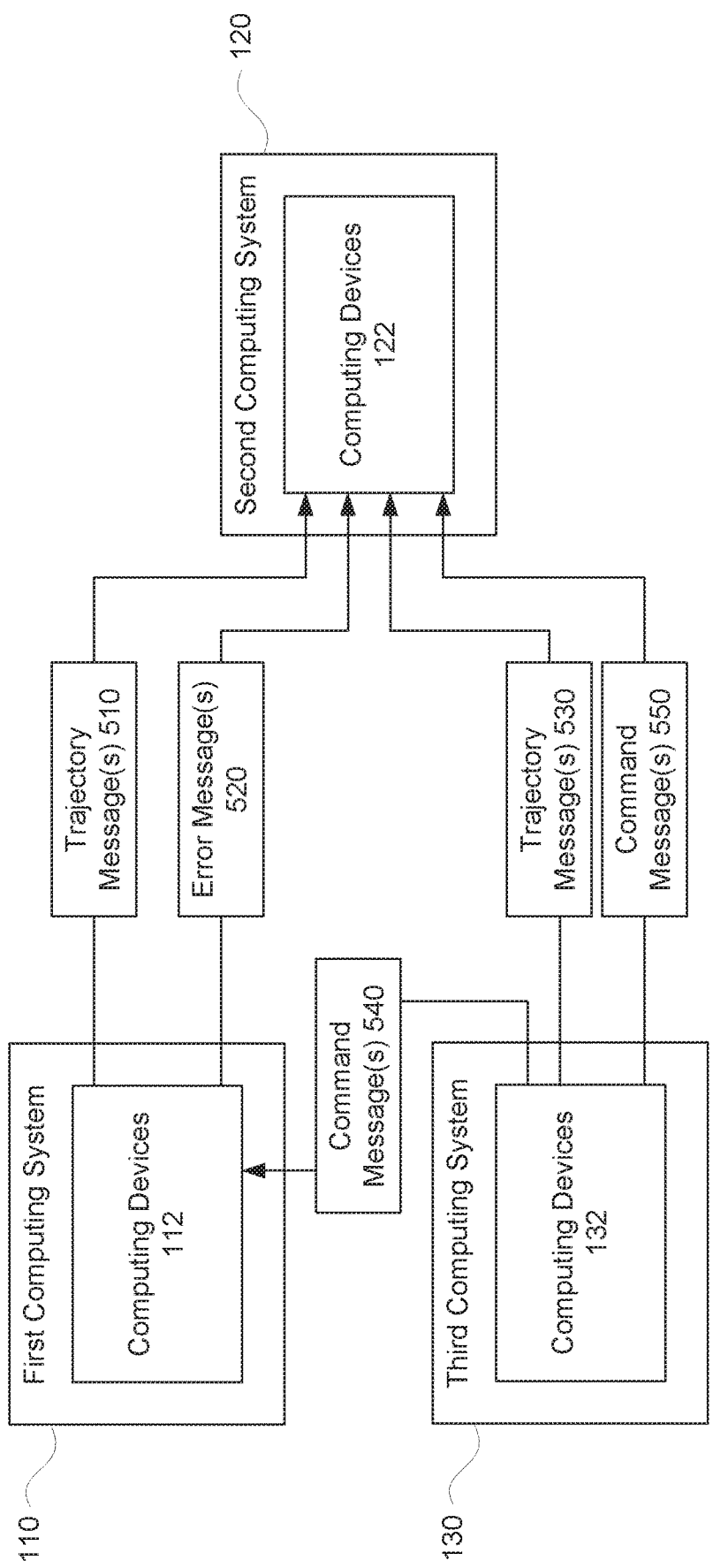
FIG. 5 is an example representation of computing systems and messages in accordance with aspects of the disclosure.

As noted above, in order to control vehicle 100 in the autonomous driving mode, the first computing system 110, second computing system 120, and third computing system 130 may exchange different types of messages and information with one another. This information may be sent, for instance, via a Controller Area Network (CAN) bus of the vehicle. Referring to FIG. 5, the computing devices 112 of the first computing system 110 may send trajectory messages 510 including trajectories and error messages 520 including errors to the computing devices 122 of the second computing system 120. In addition, these messages, and in particular the error messages 520 may be received by the computing devices 132 of the third computing system 130. The computing devices 132 of the third computing system 130 may also send trajectory messages 530 to the computing devices 122 of the second computing system 120. In some instances, the computing devices 132 of the third computing system 130 may also send command messages 540 and/or command messages 550 to the computing devices 112 of the first computing system 110 and to the computing devices 122 of the second computing system 120.

Figure 6:
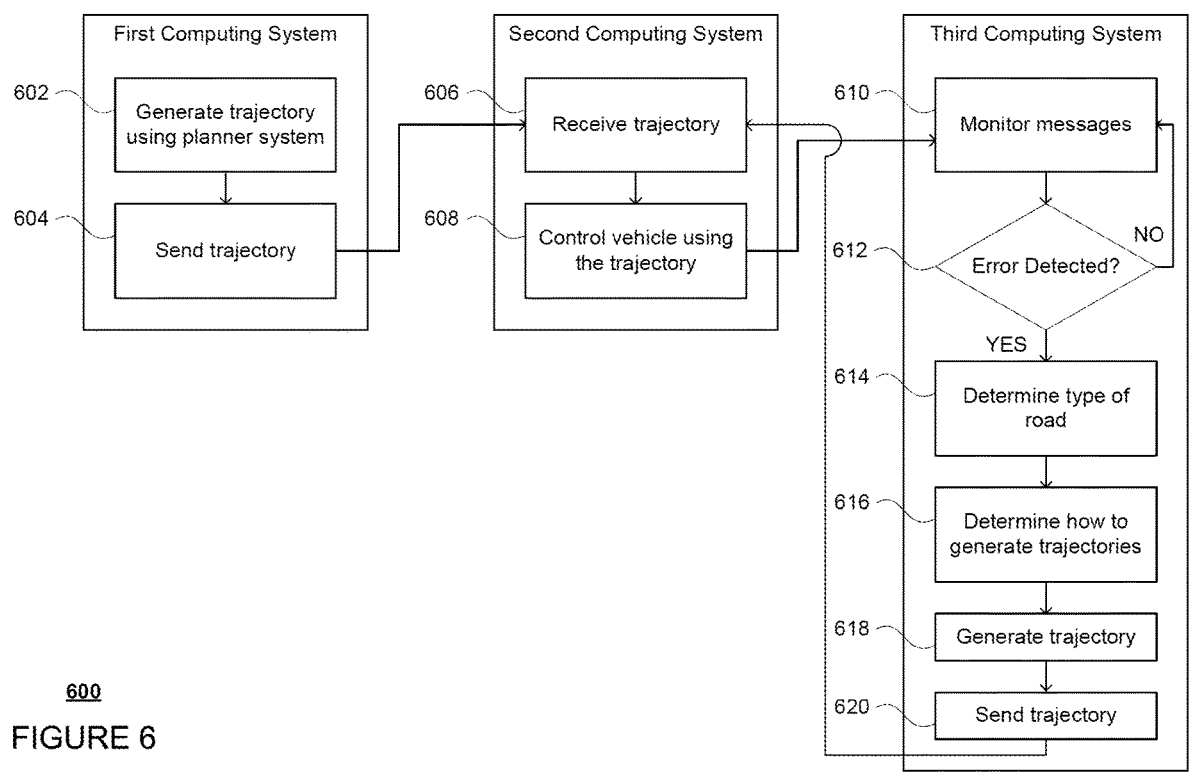
FIG. 6 is an example flow diagram in accordance with aspects of the disclosure.

FIG. 6 is an example flow diagram 600 for controlling a vehicle, such as vehicle 100, in an autonomous driving mode using first, second and third computing systems such as first computing system 110, second computing system 120, and third computing system 130. For instance at block 602, the planner system 270 of the first computing system may use various inputs to generate new trajectories for the vehicle as discussed above.

As shown in blocks 604 and 606, these trajectories may be sent by the computing devices 112 of the computing system 110 to the computing devices 122 of the computing system 120, for instance, via trajectory messages 510 of FIG. 5. In response, as shown in block 608, the computing devices 122 may control the vehicle in the autonomous driving mode according to the received trajectory. For instance as noted above, the computing devices 122 may control the vehicle to follow the trajectory by sending commands to control the actuators of the deceleration system 140, acceleration system 150, steering system 170, and/or power system 160.

Figure 7:
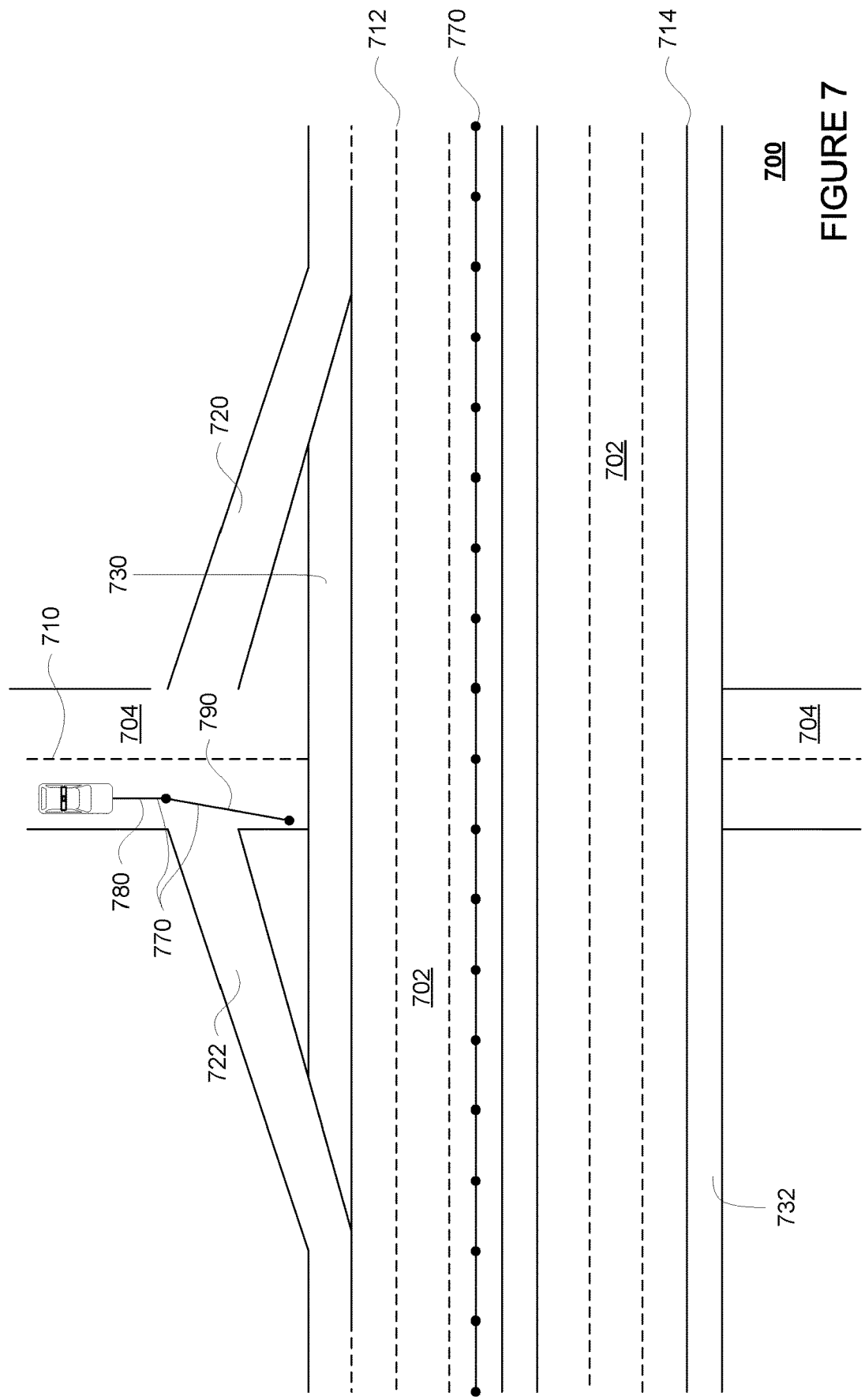
FIG. 7 is an example of a vehicle being maneuvered on a section of roadway in accordance with aspects of the disclosure.

FIG. 7 provides an example of vehicle 100 functioning according to blocks 602-608 of flow diagram 600. In this example, vehicle 100 is being maneuvered on a section of roadway 700 including highway 702 and surface street 704. In example of FIG. 7, highway 702 and surface street 704 correspond to highway 402 and surface street 704 of the map information 400, respectively. In this example, lane lines 710, 712, and 714 correspond to the shape, location, and other characteristics of lane lines 410, 412, and 414, respectively. Similarly, highway exit ramp 720, highway entrance ramp 722, shoulder areas 730, 732, etc. correspond to the shape, location, and other characteristics of highway exit ramp 420, highway entrance ramp 422, shoulder areas 430, 432, etc. Vehicle 100 is approaching highway entrance ramp 722 from surface street 704, and following a trajectory 770. At this point, trajectory 770 is a current trajectory having a first portion 780 to control the vehicle to a destination and a second portion 790 to control the vehicle to pull over and stop in the event the computing system 110 does not provide a new trajectory the second computing system 120.

As such, the vehicle 100 will proceed along the trajectory, following at least the first portion of the current trajectory, such as first portion 780, until a new trajectory is received by the computing devices 122 of the second computing system 120 from the planner system 270. Typically, a new trajectory would be generated, received by the computing devices 122, and acted upon prior to the start of the second portion of a current trajectory, such as second portion 790. Of course, if not, the computing devices 110 will seamlessly continue to control the vehicle in order to follow the second portion of the trajectory and cause the vehicle to pull over, stop, etc.

Returning to FIG. 6, while this process is occurring, as shown in block 610, the computing devices 132 of the third computing system 130 may monitor the messages sent from the first computing system to the second computing system, including the aforementioned error messages 520. These error messages may indicate errors in the first computing system. In this regard, the third computing system may determine whether an error is detected as shown in block 612. If no errors are detected, the third computing system may continue to monitor the messages.

When an error in the first computing system is detected, the third computing system may take over for the first computing system in order to generate trajectories and send these trajectories to the second computing system. In order to do so, the third computing system may request for first computing system to be shut down, for instance by sending a command message, such as command messages 540 of FIG. 5, to the first computing system. Alternatively, both the first and third computing system may continue to simultaneously generating trajectories (with some amount of common initial smoothness) all of the time. In this instance, the second computing system may arbitrate between the trajectories from each of the first and third computing system and determine which to use. To avoid the need for this arbitration, the third computing system may send a command message, such as command messages 550, to the second computing system to disregard trajectories from first computing system.

In order to do so, when an error in the first computing system is detected, the computing devices 132 of the third computing system 130 may determine a type of road on which the vehicle is driving as shown in block 614. This may involve comparing the vehicle's last known or current location from the positioning system 250 and/or positioning system 290 to map information stored in memory 236 of computing devices 132. As an example, using the location and the map information, the computing devices 132 may determine a road segment on which the vehicle is traveling. This road segment may be associated with an identifier indicating a type of the road segment, for instance, a highway or a surface street. Thus, put another way, the computing devices 132 may determine whether the vehicle is on a highway or a surface street.

As shown in block 616, based on the determined type of road, the third computing system may determine how to generate trajectories to control the vehicle and according to what functionality. For instance, if the vehicle is determined to be located on a highway, in some situations, the third computing system need not use certain features of the perception system 292 such as the ability to detect traffic lights and traffic lights states using the aforementioned traffic light detection system software module or functionality. In this regard, this functionality may be turned "off" and need not be used by the third computing system to generate trajectories. In addition, detecting objects very close to the vehicle may be less critical, and may be given lower processing priority, as there are not likely to be pedestrians or bicyclists on highways. Still further, in situations where there is not much traffic, because the vehicle is more likely to be continuously moving, it may be unlikely that another road user is going to enter into the vehicle's blind spot, and again detecting objects very close to the vehicle may be given lower processing priority.

These trajectories may include those that allow the vehicle to maintain its lane or move, one lane at a time, to the right such that the vehicle becomes in a position to exit the highway in order to reach surface streets. In addition, when generating trajectories, the third computing system may search for a nearby exit proximate to surface streets with certain characteristics, such as available parking, routes that avoid traffic signals, routes that avoid specific maneuvers (such as unprotected turns), routes that avoid known construction zones, etc.

In addition or alternatively, when generating trajectories, the third computing system may also consider different aspects of the third computing system's functionality. For instance, when the vehicle operating on highways or surface streets the perception system 292 and planner system 294 of the third computing system 130 need not actually differentiate between different types of object. In addition, the computing devices 132 of the third computing system 130 may make very basic predictions about these objects. However, in some instances, some differentiation may be performed automatically by software modules of the sensors themselves, such as a LIDAR system, such as that of dome housing 312, which can identify and differentiate between pedestrians and vehicles automatically. Of course, these objects may all still be treated the same in order to limit the processing and power requirements of the third computing system 130.

In some instances, when an error in the first computing system 110 is detected, the third computing system 130 may also assess the functionality of available sensors of the vehicle in order to determine what if any types of location the vehicle should avoid. at is one of the primary sensors for that use case. In other words, there may be a hierarchy of road scopes requiring different types of functionality, and if the vehicle does not have the functionality required for a certain road scope, the third computing system may avoid areas having that road scope. For instance, certain types of failures, such as power system or individual sensor problems, may reduce the vehicle's capability of detecting objects in the vehicle's environment at certain locations. In this regard, the third computing system 130 may determine which of the vehicle's sensors are still functional and generate trajectories accordingly. For example, if a rear-left corner radar of the vehicle 100 has been compromised (i.e. is no longer functioning to operating specifications), then lane changes to the left on high speed roads may be avoided, since the rear-left corner radar may be important for such maneuvers. As another example, in some instances, such as where the third computing system is not able to detect traffic lights due to an error in a camera sensor used for this purpose, when the vehicle is on a highway, the third computing system may cause the vehicle to stay on a highway and pull over on the highway rather than entering surface streets. In addition, the third computing system may avoid routes with certain types of maneuvers or those that pass through certain types of areas. This may include routes with unprotected turns, multipoint turns including those where there is or is not a shoulder area, high speed lane changes, parking lots, construction zones, school zones, 4-way stops, narrow roads, one-way roads, low-friction roads (i.e. gravel), roads with poor lighting at night, roads with suicide lanes, etc.

Based on the determination of how to generate trajectories and according to what functionality, the computing devices 132 of the third computing system 130 may generate trajectories at block 618 as described above. As shown in block 620 and 606, these trajectories may be sent to and received by the computing devices 122 of computing system 120, for instance, via the trajectory messages 530 of FIG. 5. In response, as shown in block 608, the computing devices 112 may control the vehicle in the autonomous driving mode according to the received trajectory. For instance as noted above, the computing devices 112 may control the vehicle to follow the trajectory by sending commands to control the actuators of the deceleration system 160, acceleration system 150, steering system 170, and/or power system 160.

Returning to block 614, when the vehicle is determined to be located on surface streets or once the vehicle reaches surface streets, the third computing system may require the functionality for detecting traffic lights and traffic lights states. In addition, detecting objects very close to the vehicle, for instance, alongside of the vehicle, may be much more important. Because of this, the third computing system 130 may generate trajectories which cause the vehicle to be controlled in order to drive at a predetermined limited speed, such as 10 miles per hour or less, to increase the likelihood of such objects being detected by functioning sensors of the vehicle and to provide the third computing system with additional time to detect and respond to these objects. In addition, as noted when driving on surface streets, the planner system 294 of the third computing system 130 may only allow or generate trajectories for certain types of maneuvers and may prohibit or limit generating trajectories for other types of maneuvers such as turns with certain types of curvature, unprotected turns, multipoint turns, etc. In some examples, when driving on surface streets, the third computing system may also generate trajectories in order to prevent the vehicle from entering certain areas, such as those identified in the map information as high pedestrian and/or vehicular traffic areas. In this regard, the planner system of the third computing system may avoid generating trajectories that route the vehicle through these areas.

Again, based on the determination of how to generate trajectories and according to what functionality, the third computing devices may generate trajectories at block 618 as described above. As shown in blocks 620 and 606, these trajectories may be sent to and received by the computing devices 122 of the computing system 120, for instance, via the trajectory messages 530 of FIG. 5. In response, as shown in block 608, the computing devices 112 may control the vehicle in the autonomous driving mode according to the received trajectory. For instance as noted above, the computing devices 112 may control the vehicle to follow the trajectory by sending commands to control the actuators of the deceleration system 140, acceleration system 150, steering system 170, and/or power system 160.

The features described herein may allow the vehicle to continue to be controlled safely in the event of various types of failures of a first or primary computing system. In addition, these features allow for different fallback behaviors depending upon what functionality is available and where the vehicle is currently located. In other words, the third computing system is able to leverage current functionality to get to the best possible outcome. For instance, during highway driving, the vehicle may continue driving in its current lane before attempting to change lanes or pull over as the computational power and sensors required to accomplish this are significantly less than what would be required to accomplish the same for non-highway driving (i.e. surface streets). When driving on surface streets, the vehicle may be slowed down dramatically, for instance to 10 mph or more or less, in order to better enable the vehicle's sensors and other systems to detect and respond to objects. This additional level of sophistication over the typical, severe reaction of stopping a vehicle immediately may be significantly safer especially in certain driving situations such as highway driving and/or high traffic areas.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A control system for controlling a vehicle in an autonomous driving mode, the control system comprising:
    a plurality of sensors configured to generate sensor data;
    a primary computing system configured to:
        generate different behavior predictions based on each of different types of road users in the sensor data,
        generate trajectories using the sensor data, and
        send the generated trajectories to a secondary computing system configured to cause the vehicle to follow a received trajectory; and
    a backup computing system configured to, when there is a failure of the primary computing system, generate and send one or more trajectories to the secondary computing system to control the vehicle to maneuver to a stopping location.

2. The control system of claim 1, wherein the backup computing system sends the one or more trajectories to the secondary computing system based on a type of road on which the vehicle is currently traveling.

3. The control system of claim 2, wherein the type of road is a highway or a surface street.

4. The control system of claim 1, wherein the backup computing system has greater computing capabilities than the secondary computing system.

5. The control system of claim 1, wherein the backup computing system has lesser computing capabilities than the primary computing system.

6. The control system of claim 1, wherein the backup computing system is further configured to prevent the vehicle from making certain types of maneuvers which are allowed by the primary computing system.

7. The control system of claim 6, wherein the certain types of maneuvers include turns of a certain curvature.

8. The control system of claim 1, wherein the failure relates to one or more of the plurality of sensors, and the backup computing system is configured to generate the one or more trajectories further based on which of the plurality of sensors is functioning.

9. The control system of claim 1, wherein the secondary computing system is not configured to differentiate between the different types of road users in the sensor data.

10. The control system of claim 1, wherein the backup computing system is further configured to generate the different behavior predictions in a same way as the primary computing system.

11. The control system of claim 1, wherein the backup computing system is further configured to generate behavior predictions corresponding to either following a current lane or changing lanes in response to a detection of any given road user on a highway.

12. The control system of claim 1, wherein the primary computing system is further configured to generate trajectories according to a first list of possible maneuvers, and
wherein the backup computing system is further configured to generate the one or more trajectories according to a second list of possible maneuvers that is smaller than the first list of possible maneuvers.

13. The control system of claim 12, wherein the backup computing system is further configured to determine the second list of possible maneuvers based on whether the vehicle is located on a highway or a surface street.

14. The control system of claim 12, wherein the backup computing system is further configured to determine the second list of possible maneuvers based on which of the plurality of sensors is functioning.

15. An autonomous vehicle comprising:
a plurality of sensors configured to generate sensor data;
a primary computing system configured to generate different behavior predictions based on each of different types of road users in the sensor data, and generate trajectories using the sensor data;
a secondary computing system configured to receive the generated trajectories from the primary computing system to cause the autonomous vehicle to follow a received trajectory; and
a backup computing system configured to, when there is a failure of the primary computing system, generate and send one or more trajectories to the secondary computing system to control the autonomous vehicle to maneuver to a stopping location.

16. The autonomous vehicle of claim 15, wherein the backup computing system sends the one or more trajectories to the secondary computing system based on a type of road on which the autonomous vehicle is currently traveling.

17. The autonomous vehicle of claim 16, wherein the type of road is a highway or a surface street.

18. A control system fir controlling a vehicle in an autonomous driving mode, the control system comprising:
a plurality of sensors configured to generate sensor data;
a primary computing system configured to generate different behavior predictions based on each of different types of road users in the sensor data, and generate trajectories using the sensor data;
a secondary computing system configured to receive the generated trajectories from the primary computing system to cause the vehicle to follow a received trajectory; and
a backup computing system configured to, when there is a failure of the primary computing system, generate and send one or more trajectories to the secondary computing system to control the vehicle to maneuver to a stopping location.

19. The control system of claim 18, wherein the backup computing system sends the one or more trajectories to the secondary computing system based on a type of road on which the vehicle is currently traveling.

20. The control system of claim 19, wherein the type of road is a highway or a surface street.

* * * * *

UNITED STATES PATENT AND TRADEMARK OFFICE
CERTIFICATE OF CORRECTION

PATENT NO. : 11,693,405 B2
APPLICATION NO. : 17/037924
DATED : July 4, 2023
INVENTOR(S) : Emily Chi et al.

Page 1 of 1

It is certified that error appears in the above-identified patent and that said Letters Patent is hereby corrected as shown below:

In the Claims

Column 16, Line 25, Claim 18:
Now reads: "system fir controlling"; should read -- system for controlling --

Signed and Sealed this
Fifteenth Day of August, 2023

Katherine Kelly Vidal
*Director of the United States Patent and Trademark Office*